Sept. 20, 1949.  F. ADAM  2,482,310
BUS DUCT
Filed Dec. 5, 1946  2 Sheets-Sheet 1
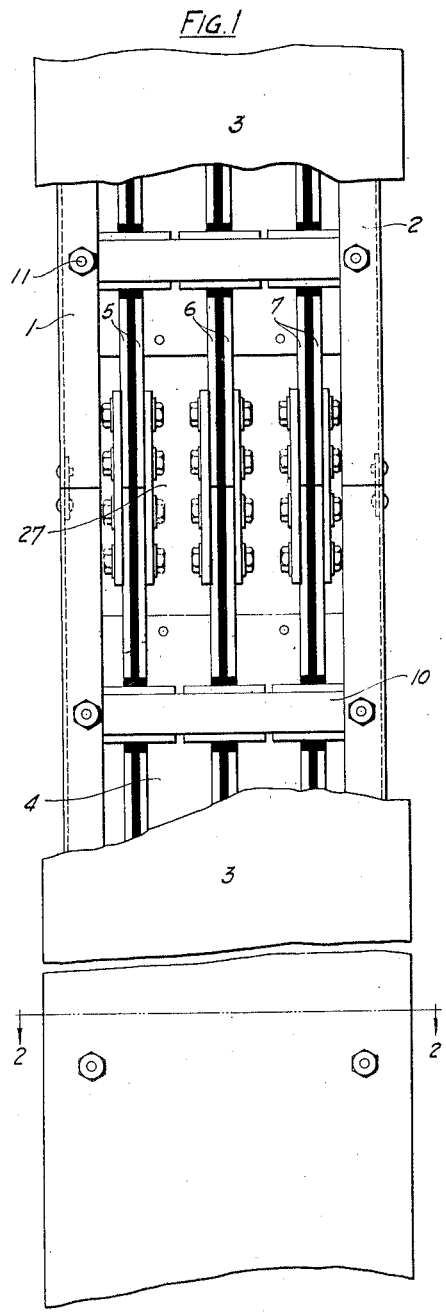
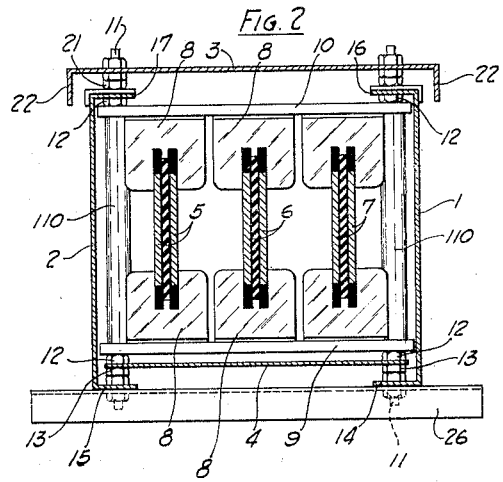
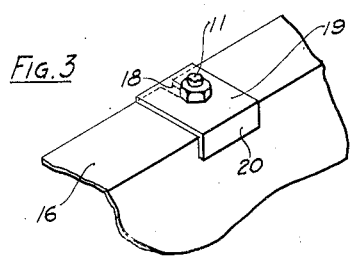
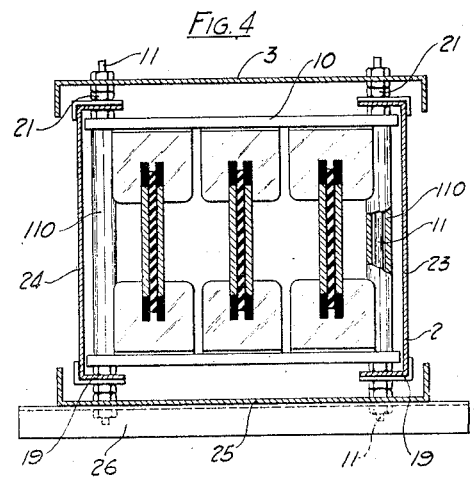
INVENTOR.
FRANK ADAM
BY
HIS ATTORNEYS Sept. 20, 1949.    F. ADAM    2,482,310
BUS DUCT
Filed Dec. 5, 1946    2 Sheets-Sheet 2
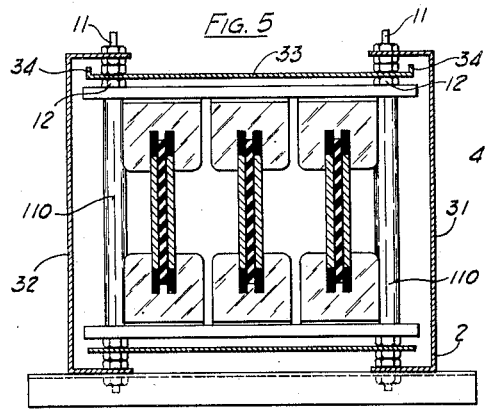
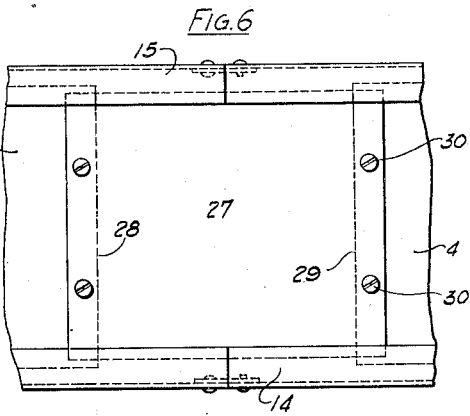
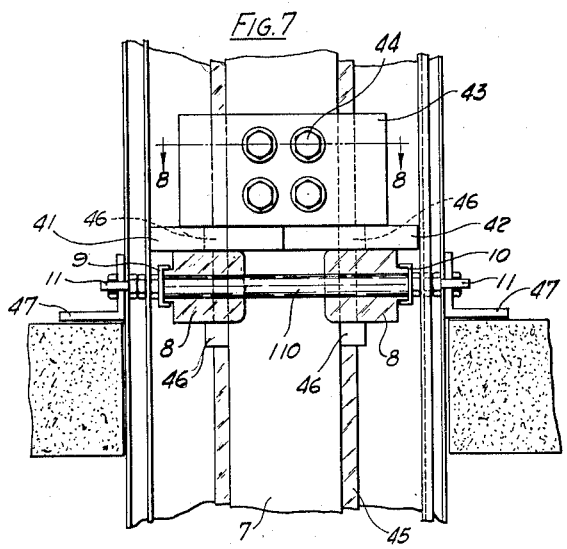
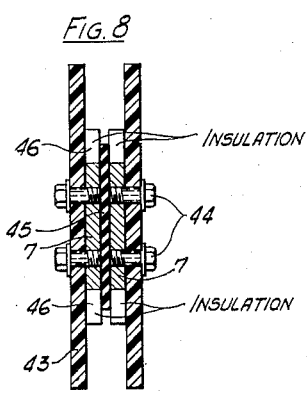
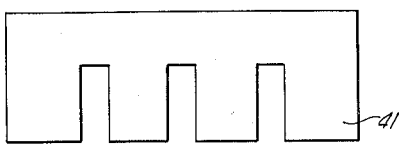
INVENTOR.
FRANK ADAM
BY
HIS ATTORNEYS Patented Sept. 20, 1949

2,482,310

UNITED STATES PATENT OFFICE 2,482,310

BUS DUCT

Frank Adam, Huntleigh Village, Mo., assignor to Frank Adam Electric Company, St. Louis, Mo., a corporation of Missouri Application December 5, 1946, Serial No. 714,278

3 Claims. (Cl. 174—99)

This invention relates generally to busduct and particularly to ventilated busduct.

The use of busduct in power distribution systems has become quite common as it provides a convenient means of handling currents of high magnitude, and by the provision of suitable plug-in devices the connection of branch circuits is facilitated. Although some of the first industrial applications of busduct distribution systems involved the utilization of wire mesh or expanded metal as the duct body, such systems have, for the most part, been constructed of imperforate duct material. The use of imperforate duct material has been dictated largely by the fact that it prevented accidental or intentional contact with the live bus bars by instruments or objects from the outside. The imperforate duct has the disadvantage, however, that the heat generated in the bus bars, where the currents being conducted are of high magnitude, is not dissipated by convection out of the enclosure. Consequently, imperforate ducts about bus bars reduce the capacity of the busduct system.

In situations where, for the sake of economy, it is imperative to load the bus bars to near capacity, it is highly advantageous to provide for the circulation of air about the bus bars. For safety reasons, however, it is also imperative to arrange the structure so that foreign objects, animate or inanimate, cannot be contacted with the bus bars. These requirements have led to the covering of bus bars with a protective insulating material where the duct is to be ventilated, but such covering of the bus bars may impair the heat-dissipating capacity of the bars, so that it is debatable whether the end result is any better than unventilated duct.

The object of the present invention, generally stated, is to provide ventilated busduct having bare bus bars adequately protected against contact with foreign objects.

Other objects will become apparent to those skilled in the art when the following description is read in connection with the accompanying drawings, in which:

Figure 1 is a plan view of a run of ventilated busduct constructed in accordance with the present invention, part of the near wall being broken away to reveal the relation of the parts;

Figure 2 is a sectional view taken along line 2—2 of Figure 1;

Figure 3 is a perspective view showing in particular a retaining clip for holding the duct walls in position;

Figure 4 is a view corresponding to Figure 2, but showing a modified form of the ventilated busduct;

Figure 5 is another view corresponding to Figure 2, but showing a still further embodiment of the invention;

Figure 6 is a bottom plan view showing an access opening and closure for the busduct of the present invention;

Figure 7 is a view in side elevation (with near wall of the duct removed) showing the arrangement of a vertical support and flame barrier within a vertical section of duct;

Figure 8 is a sectional view taken along line 8—8 of Figure 7;

Figure 9 is a plan view of the flame barrier shown in Figure 7; and

Figure 10 is a plan view of an insulator block.

In accordance with the present invention, ventilated busduct walls are assembled together so as to be in spaced relation at the corners, but sufficiently overlap each other at such corners so that foreign objects cannot accidentally be passed through the space and into contact with bare bus bars within the duct, yet ample venting is provided.

Referring now to the drawings for an embodiment which illustrates the invention as applied to busduct containing three sets of paired bus bars, the duct may consist of side walls 1 and 2, a top wall 3, and a bottom wall 4 enclosing three pairs of bare bus bars 5, 6, and 7. The bus bars 5, 6, and 7 are received in blocks 8 of insulating material, such as porcelain, in the manner shown generally in Patent No. 2,310,919 and in the co-pending application of Frederick B. Adams, Serial No. 496,260, now Patent No. 2,435,113, issued January 27, 1948. To accommodate the bus bars, each of the blocks 8 is provided with a recessed portion of a size such as to receive the paired bus bars, an intervening layer of insulating material, and suitable cushion blocks. The size of the recess is appropriately reduced if but one bus bar is to be received therein. The sets of insulators 8 below the bus bars are mounted in a channel 9 and the sets above the bus bars are similarly mounted in a channel 10, the open sides of the channels 9 and 10 facing each other, as shown clearly in Figure 7. To connect the channels 9 and 10 together and retain the insulators and bus bars in spaced relation, studs 11 and spacing sleeves 110 are provided at each side of the assembly. It will be observed that nuts 12 at each end of both studs 11 engage directly against the closed sides of channels 9 and 10 with intervening washers, if desired, so that, when the nuts 12 are drawn down on both ends of the studs 11, the desired clamping force upon the spacing sleeve 110 may be exerted. Such an arrangement holds the several parts in their proper relation without, however, gripping the bus bars to an extent such that limited longitudinal creepage is precluded.

Upon the nuts 12 on the bottom side of the enclosure, as shown in Figure 2, a flat bottom plate 4 is mounted, so that the extending lower ends of studs 11 project therethrough. The bottom closure plate 4 may be held in the appropriate position upon studs 11 by a pair of nuts 13 threaded upon the studs.

After the nuts 13 have been drawn up against plate 4, any suitable spacing device, such as another set of nuts, may, if desired, be applied over the projecting lower ends of the studs 11. Side wall members 1 and 2, which are respectively provided with inturned flanges 14 and 15 running lengthwise along their lower margins, are then applied. The flanges 14 and 15 are provided with holes to receive studs 11. The upper margins of the side wall members 1 and 2, however, although likewise provided with longitudinally extending flanges 16 and 17, are not provided with holes for the reception of the projecting ends of studs 11, but are provided with open slots 18, as shown in dotted lines in Figure 3. It will be apparent that, taking side wall member 1 for example, the member could not be inserted over both ends of the stud 11 if enclosed holes were provided in both the upper and lower flanges thereof. Since an open slot, such as 18, does not restrain the side wall members from outward movement, a retaining clip 19, having a closed hole for the reception of stud 11 and a depending lip 20 for engagement with the vertical surface of side wall member 1, is provided for retaining the upper edge of the side wall members in position.

When the upper flanges 16 and 17 have been seated over the studs 11, and the clips 19 applied, the same may be retained in position by nuts 21 drawn down thereagainst. The suitable spacing device, such as another nut, may then be applied upon the projecting upper ends of the studs 11, if desired, and finally the top plate 3, having holes arranged for the reception of studs 11, is applied thereto. It will be observed that the plate 3 is provided with longitudinally extending downturned flanges 22 at both sides thereof, the downward extent of such flanges being sufficient at least to bridge the gap provided by the spacing means between the inturned flanges 16 and 17 of the side wall members and the horizontal surface of the plate 3, as seen in Figure 2.

With the arrangement just described, it will be apparent that, since the bottom plate 4 terminates short of the vertical surface of side wall members 1 and 2, a vent is provided therebetween, but such vent is closed against access by foreign objects by the inturned flanges 14 and 15 extending in parallel spaced relation to the plate 4. Similarly, the horizontally spaced relation between the vertical walls of side members 1 and 2, and the depending flanges 22 of top closure plate 3 provides a vent at the top of the duct, as seen in Figure 2, of such character that the insertion of foreign objects is precluded.

In the form shown in Figure 4, the parts are identical with the arrangement just described in connection with Figure 2, save that the side wall members 23 and 24 are of lesser vertical extent than were the side wall members 1 and 2 of the previous embodiment. In the Figure 4 embodiment, the inturned flanges of the side wall members seat directly against the nuts 12. In this case the bottom closure is accomplished by the provision of a flanged plate 25 identical with the top closure plate 3, but in reversed position. The inturned flanges at the margins of the side plates 23 and 24 are, both at the top and bottom thereof, provided with open slots, such as 18 (shown in Figure 3), for the reception of studs 11 and are retained in position at all four corners by clips 19. Obviously the slot and clip retaining arrangement may be eliminated at either the top or bottom of either side closure, and as an alternative thereto holes for the reception of studs 11 provided, as in the previous case.

In the further embodiment shown in Figure 5, the parts are identical to the arrangement shown in Figure 2, save that the side wall members 31 and 32 are of greater vertical extent than in the Figure 2 embodiment, and the top closure plate 33 is arranged within the top marginal flanges of the side walls. In this instance, the top closure plate 33 is provided with upturned flanges 34 extending longitudinally thereof, and the top closure plate is seated directly upon the nuts 12 at the top of studs 11. The upturned flanges 34 may, in fact, be omitted, as the overlapping relation between the upper flanges of side wall members 31 and 32 is sufficient to preclude the insertion of foreign objects in such manner as to contact the bare bus bars, but, where the atmosphere about the busduct may be dust-laden, the upturned flanges 34 have the advantage of precipitating dust from the air stream which may be leaving the enclosure through the space between plate 33 and the flanges of side members 31 and 32. Moreover, the upturned flanges 34 will intercept the passage of small objects, such as nails, screws, nuts, or bolts, which may be dropped upon the duct and, but for the presence of flanges 34, might roll into the inclosure.

In Figures 1, 2, 4, 5, and 7, a mounting bracket 26 is shown as connected to the bottom ends of the studs 11 to secure the busduct assembly in appropriate suspended relation in a building in which it may be installed. Obviously the bracket 26 may be provided at the upper end of studs 11, or at both ends, if desired. It will also be understood that the busduct may, if desired, be installed upside down, or at right angles to the position shown in the drawings.

In busduct systems it is imperative that access openings be provided in order to make the necessary joint connections between longitudinal runs of bus bars and to connect branch circuits. In order to accomplish this consistent with the present invention, one of the duct wall members may be provided with a removable section. For example, as shown in Figure 6, a plate 27 is provided for bridging the space between ends 28 and 29 of an interrupted bottom wall 4. In the form shown in Figure 6, the closure plate 27 is of approximately the same width as the bottom wall plate 4, so that it may be moved relative to the side walls in order to clear one of the overlapping flanges 14 and 15. In order to retain the closure plate 27 in position, screws 30 are inserted through appropriate holes in the closure plate for threaded engagement with the wall plate 4 adjacent margins 28 and 29.

In cases where the run of busduct is extending vertically through the floors and ceilings of a building, it is desirable to provide a flameproof barrier at each story. The arrangement of the ventilated busduct of the present invention is readily adapted to the provision of such a firebreak. As shown in Figure 7, a pair of identical flameproof boards 41 and 42, such as asbestos board, having openings cut therein to accommodate the bus bars, are arranged on opposite sides of the bus bars to extend completely across and substantially close the interior space of the duct. The boards 41 and 42 rest upon the upper surfaces of a set of insulators 8, which are disposed adjacent the floor or ceiling of the building through which the duct is extending. Secured to each bus bar is a transverse abutment plate 43 of strong dielectric material, such as a laminated phenol-formaldehyde condensation product of the character commonly used for electrical insulation, suitably secured to the adjacent bus bar as by jam bolts 44. While the bolts 44 are threaded into the respective bus bars, the bolts do not extend through the layer of insulation 45 which separates the paired bus bars. The plates 43, being thus connected to the bus bars thereadjacent, transmit the vertical bus bar load as compressive forces through boards 41 and 42 to the insulators 8. Longitudinal slippage of the insulation layer 45 is prevented by cementing the same to pieces of insulation, such as cushion blocks 46, at intervals throughout the length of the run, as, for example, at the upper end of each section. The blocks 46 are keyed to insulators 8 to prevent longitudinal slippage thereof, and engage the edges of the bus bars to cushion the same. The weight of the entire structure is sustained by studs 11 connected to brackets 47 suitably secured to the floor or ceiling of the building.

From the foregoing description, those skilled in the art should readily understand the construction, operation, and advantages of the ventilated busduct constructed in accordance with the present invention. While several embodiments have been disclosed, it is not to be understood that the invention is limited to the details of those embodiments, but, on the contrary, that the invention is susceptible of various modifications and adaptations without departing from the spirit of the invention or the scope of the appended claims.

Having thus described the invention, what is claimed and desired to be secured by Letters Patent is:

1. Ventilated busduct comprising, spaced bus bars, a rectangular enclosure for said bus bars consisting of identical opposite side wall members and opposite transverse wall members, said side wall members having their margins inturned to form flanges extending toward each other, said transverse wall members overlapping said flanges, bolts extending through the flanges and the adjacent overlapping portions of the respective transverse wall members, spacing means on the bolts between the respective flanges and the adjacent transverse wall members, the spacing between the respective flanges and the adjacent transverse wall members being less than the transverse overlap therebetween.

2. Ventilated busduct comprising, spaced bus bars, a rectangular enclosure for said bus bars having opposite imperforate vertical wall members and opposite imperforate horizontal wall members, the vertical wall members each having an edge flange extending horizontally for a substantial distance in vertically spaced relation to and exteriorly of the adjacent horizontal wall member, said last mentioned horizontal wall member terminating short of the vertical wall members but overlapping the flanges thereof for a distance exceeding the space between said flanges and said horizontal wall member.

3. Ventilated busduct comprising, spaced bus bars, a rectangular enclosure for said bus bars consisting of opposite imperforate side wall members and opposite imperforate transverse wall members, said wall members being spaced from each other at each corner of the enclosure, each of said side wall members having an edge flange extending in parallel spaced relation to the adjacent transverse wall member, said last mentioned transverse wall member overhanging said side wall members and the edge flanges thereof, said transverse wall member having at each outer margin a flange extending athwart the space between said transverse wall member and the edge flange of said side wall member for a distance greater than said space.

FRANK ADAM.

REFERENCES CITED

The following references are of record in the file of this patent:

UNITED STATES PATENTS

| Number | Name | Date |
|---|---|---|
| 2,039,025 | Papst | Apr. 28, 1936 |
| 2,216,870 | Adam | Oct. 8, 1940 |
| 2,261,857 | Novak | Nov. 4, 1941 |
| 2,310,919 | Adam | Feb. 16, 1943 |
| 2,320,093 | Moore | May 25, 1943 |